US009218603B2

(12) United States Patent
Kumar

(10) Patent No.: US 9,218,603 B2
(45) Date of Patent: Dec. 22, 2015

(54) METHOD FOR PROVIDING A CONFERENCE SYSTEM ALLOWING ADVISORS TO OFFER CONFERENCE SESSIONS TO CLIENTS

(76) Inventor: Gopesh Kumar, Pleasanton, CA (US)

( * ) Notice: Subject to any disclaimer, the term of this patent is extended or adjusted under 35 U.S.C. 154(b) by 1565 days.

(21) Appl. No.: 12/436,857

(22) Filed: May 7, 2009

(65) Prior Publication Data

US 2010/0287242 A1 Nov. 11, 2010

(51) Int. Cl.

| G06F 15/16 | (2006.01) |
|---|---|
| G06Q 30/00 | (2012.01) |
| G06Q 10/10 | (2012.01) |
| G06Q 30/06 | (2012.01) |
| H04L 12/18 | (2006.01) |
| H04L 12/58 | (2006.01) |
| H04L 29/06 | (2006.01) |
| G06Q 20/22 | (2012.01) |

(52) U.S. Cl.
CPC .............. *G06Q 30/016* (2013.01); *G06Q 10/10* (2013.01); *G06Q 20/22* (2013.01); *G06Q 30/06* (2013.01); *H04L 12/1818* (2013.01); *H04L 12/581* (2013.01); *H04L 51/04* (2013.01); *H04L 65/4038* (2013.01)

(58) Field of Classification Search
USPC .......... 709/204–207, 227–229; 705/1, 3, 7, 8, 705/26, 35, 36, 37, FOR. 108, FOR. 110, 705/FOR. 111, 26.1, 26.41, 38; 379/202.01, 379/202.1; 370/260, 267, 270, 282, 352, 370/493
See application file for complete search history.

(56) References Cited

U.S. PATENT DOCUMENTS

| 6,223,165 B1 * | 4/2001 | Lauffer ...................... 705/7.13 |
|---|---|---|
| 6,346,962 B1 * | 2/2002 | Goodridge ................ 348/14.05 |
| 6,865,540 B1 * | 3/2005 | Faber et al. ................. 705/7.25 |
| 6,981,223 B2 * | 12/2005 | Becker et al. ................. 715/753 |
| 6,999,943 B1 * | 2/2006 | Johnson et al. ................. 705/39 |
| 7,343,008 B1 * | 3/2008 | Frankel ..................... 379/202.01 |
| 7,492,730 B2 * | 2/2009 | Eshel et al. .................... 370/260 |
| 7,768,999 B1 * | 8/2010 | Dhanoa et al. ................ 370/352 |
| 7,856,473 B2 * | 12/2010 | Horikiri et al. ............... 709/205 |
| 7,890,405 B1 * | 2/2011 | Robb .......................... 705/36 R |
| 7,899,694 B1 * | 3/2011 | Marshall et al. ............. 705/7.11 |
| 2002/0095379 A1 * | 7/2002 | Likourezos et al. ........... 705/40 |
| 2003/0118167 A1 * | 6/2003 | Sammon et al. ......... 379/202.01 |
| 2004/0034723 A1 * | 2/2004 | Giroti .............................. 710/8 |
| 2004/0128354 A1 * | 7/2004 | Horikiri et al. ............... 709/204 |
| 2006/0075104 A1 * | 4/2006 | Kumer ......................... 709/227 |
| 2006/0080344 A1 * | 4/2006 | McKibben et al. ........... 707/100 |
| 2006/0233120 A1 * | 10/2006 | Eshel et al. .................... 370/260 |

(Continued)

*Primary Examiner* — Saket K Daftuar

(74) *Attorney, Agent, or Firm* — White-Welker & Welker, LLC; Matthew T. Welker, Esq.

(57) ABSTRACT

A Conference System that allows Advisors to offer conference sessions to Users who buy conference session time through the system. All conference sessions shall be conducted over the phone. During the conference session, the Advisor shall be talking while all the Users shall be in listening only mode in order to maintain the Users privacy. Advisors and Users can email each other through the system message center before the conference session. During the conference session, the User and Advisor can chat real time online to answer specific questions. The Advisor and Users information such name, address, bank information, credit card info, email, phone numbers, etc are kept confidential through out the process and only "Account Name" is disclosed. The price per conference session varies from conference session to conference session. Each Advisor sets their individual conference session rate.

15 Claims, 2 Drawing Sheets

(56) References Cited

U.S. PATENT DOCUMENTS

| | | |
|---|---|---|
| 2007/0094597 A1* | 4/2007 | Rostom .................. 715/700 |
| 2007/0127400 A1* | 6/2007 | McKibben et al. .......... 370/260 |
| 2007/0286388 A1* | 12/2007 | Vaught et al. ........... 379/202.01 |
| 2008/0186879 A1* | 8/2008 | Bowman et al. ............ 370/260 |
| 2008/0201219 A1* | 8/2008 | Broder et al. ................. 705/14 |
| 2008/0215961 A1* | 9/2008 | Altberg et al. ............... 715/205 |
| 2008/0259824 A1* | 10/2008 | Frankel .................. 370/260 |
| 2009/0024623 A1* | 1/2009 | Broder et al. .................. 707/6 |
| 2009/0063353 A1* | 3/2009 | Viidu et al. .................. 705/75 |
| 2009/0106096 A1* | 4/2009 | Horowitz .................. 705/14 |
| 2009/0210496 A1* | 8/2009 | Shaffer et al. ............... 709/206 |
| 2009/0228808 A1* | 9/2009 | MacDonald et al. ......... 715/756 |
| 2009/0234680 A1* | 9/2009 | Newton .................... 705/5 |
| 2009/0281872 A1* | 11/2009 | Kalaboukis .................. 705/10 |
| 2010/0161430 A1* | 6/2010 | Mandel .................. 705/14.73 |
| 2010/0238842 A1* | 9/2010 | Narayanan et al. ........... 370/261 |

\* cited by examiner

METHOD FOR PROVIDING A CONFERENCE SYSTEM ALLOWING ADVISORS TO OFFER CONFERENCE SESSIONS TO CLIENTS

SEQUENCE LISTING OR PROGRAM

Not Applicable

FEDERALLY SPONSORED RESEARCH

Not Applicable

CROSS REFERENCE TO RELATED APPLICATIONS

Not Applicable

TECHNICAL FIELD OF THE INVENTION

This invention relates to multimedia communications over the Internet. More specifically the present invention relates to a communications system connecting Advisors to Clients in a conference setting.

BACKGROUND OF THE INVENTION

U.S. Pat. Nos. 6,223,165 and 6,523,010 issued to Lauffer both teach a method of and an apparatus for facilitating the delivery of advice to consumers using a server unit that can store and display the names and characteristics of experts and then rapidly assist in connecting the expert and consumer for real-time communication. The server can also have the ability to receive keywords from the consumer, match those keywords to one or more experts, and tell the consumer how to contact an expert.

U.S. Pat. No. 6,801,899 issued to Lauffer teaches techniques for delivering information electronically and, more particularly, for delivering advice to consumers from a diverse set of experts. Lauffer also teaches systems and methods for matching consumers' questions with experts, displaying available experts for consumer viewing and selection, providing for compensation from consumers to experts, and providing for the connection between consumer and experts.

U.S. Pat. No. 6,865,540 issued to Faber, et al. teaches a method and apparatus for implementing group calling that includes displaying a service provider, a service provider rate for communicating with the service provider, and a real-time indication of whether the service provider is available. The method taught includes the steps of: receiving a request from a first customer to communicate with the service provider and connecting the first customer to the service provider through a link capable of transmitting from the service provider to the first customer, receiving a request from a second customer to communicate with the service provider and connecting the second customer to the service provider through a link capable of transmitting from the service provider to the second customer while the first customer is coupled to the service provider, billing the first customer automatically based on the time during which the link to the first customer is maintained; and billing the second customer automatically based on the time during which the link to the second customer is maintained.

As observed in the marketplace, IP network builders or providers were still limited to the convention wisdoms of the old telephony industry. Users are given very little or no choice to leverage on their knowledge base to transform the perceived value in multimedia enhanced IP communications into financial benefit, not to mention the opportunity to participate in an open market for the acquisition of useful digital contents from sources that price their contents in a competitive fashion.

SUMMARY OF THE INVENTION

The present invention is a Conference System that allows Advisors to offer conference sessions to Users (also referred to as "Participants") who buy conference session time through the system. All conference sessions shall be conducted over the phone. During the conference session, the Advisor shall be talking while all the Users shall be in listening only mode in order to maintain the Users privacy. Advisors and Users can email each other through the system message center before the conference session. During the conference session, the User and Advisor can chat real time online to answer specific questions. The Advisor and Users information such name, address, bank information, credit card info, email, phone numbers, etc are kept confidential through out the process and only "Account Name" is disclosed.

The price per conference session varies from conference session to conference session. Each Advisor sets their individual conference session rate. User's payments for conference sessions are consumed during the registration and are not available to use to receive one-on-one advice outside of the Conference System. Users may cancel for a pre-registered conference session no less than seventy-two (72) hours prior to the start of the conference session by providing the proper notification in order to receive a refund. If the Advisor does not log into the conference system during the session, all payments will be refunded.

When the conference ends, the conference session proceeds for final settlement. During the conference settlement, the service fees are calculated and deducted from total conference revenue and the net revenue is credited to Advisor's account. The Advisor's Payouts are made every Friday for the prior week's aggregate income. Prior week time period is Monday through Sunday. Payout will be made electronically via Direct Deposit to a bank account or PayPal account. A balance of at least $20 must accrue in Advisor's System account before Payout is disbursed.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. The invention is a method for providing a Conference System Allowing Advisors to Offer Conference Sessions to Clients. The present invention allows a conference session over the phone between a Host (also referred to as an "Advisor") and multiple participants (also referred to as "Users") in a private, secure, and confidential manner. Advisor and Users information such name, address, bank information, credit card info, email, phone numbers, etc are kept confidential through out the process and only "Account Name" is disclosed. Before the users are connected to a conference session, they are announced with the following message: "This is a listening only conference."

During the conference, a User will listen to their Advisor but they would not able to talk to their Advisor or any participant in the conference in order to maintain privacy of everyone. If the User needs to send a message to their Advisor, they can login to their account online and send a message to the Advisor using the Conference Center which allows real time online chat between User and Advisor. Before the users are connected to a conference session, they are announced with the following message: "During the conference, an Advisor will be talking while all the Users will be in listen only mode." An Advisor should login to their account to see currently signed in users and also, to view any chat message received during the conference from the conference Users.

Figure 1:
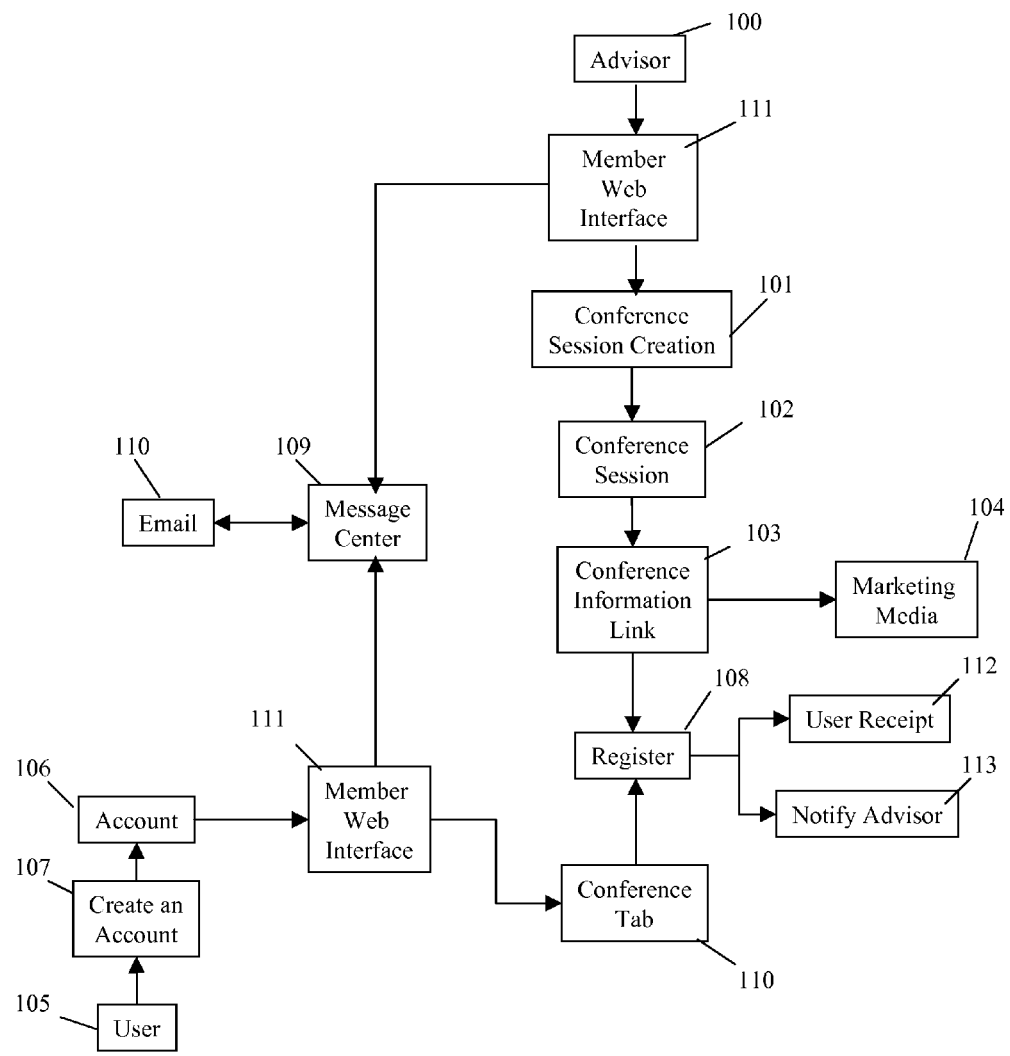
FIG. 1 illustrates the Conference Creation and User Registration of the present invention.

Now referring to FIG. 1, the Conference Creation and User Registration Flow is illustrated. An Advisor 100 logs into the Member Web Interface 111 and creates the conference session 101 by inputting date & time, charge, subject, and description information about the conference in the online system. Upon successful conference session creation 102, a Conference Information link 103 is provided to the Advisor to integrate it with online and other marketing media 104.

To find available conference sessions a User 105 needs to check with their Advisor 100; or, find through Marketing Media 104; or search from within a "Conference" tab 110 in a Member Web Interface 111. If the User 105 knows the Conference ID or the Advisor name, s/he can search from within a "Conference" tab 110 in a Member Web Interface 111. A User 105 finds the conference session 101 and related information and if the User is interested in registering for it, s/he proceeds. If the User 105 has account 106 in the system, s/he logs into the system and registers 108 for the conference session 102. Otherwise the User creates an account 107 in the system and then, registers 108 for the conference session 102. The User 105 is emailed the user receipt 112 with conference dial-in instructions and purchase receipt. Also, the Advisor 100 is notified 113 of the registration 108 and sees only the User account name and all other information is kept confidential. Users 105 can email the Advisor 100 for any question using a Message Center 109 to maintain confidentiality. Similarly, the Advisor 100 can email 110 the User 105 questions or other information.

For a User 105 to join a conference session for which they are registered, the User 105 will need their unique Dial-In ID and current PIN. No more than five (5) minutes prior to the start of the conference session the User must dial in to the appropriate number. If a User 105 is registered for multiple conference sessions around the same time, they will be prompted to enter Conference Id and will also need to know the Conference ID located in the Member Web Interface 111 for each conference and also provided through conference registration receipt email 112 to the User.

Figure 2:
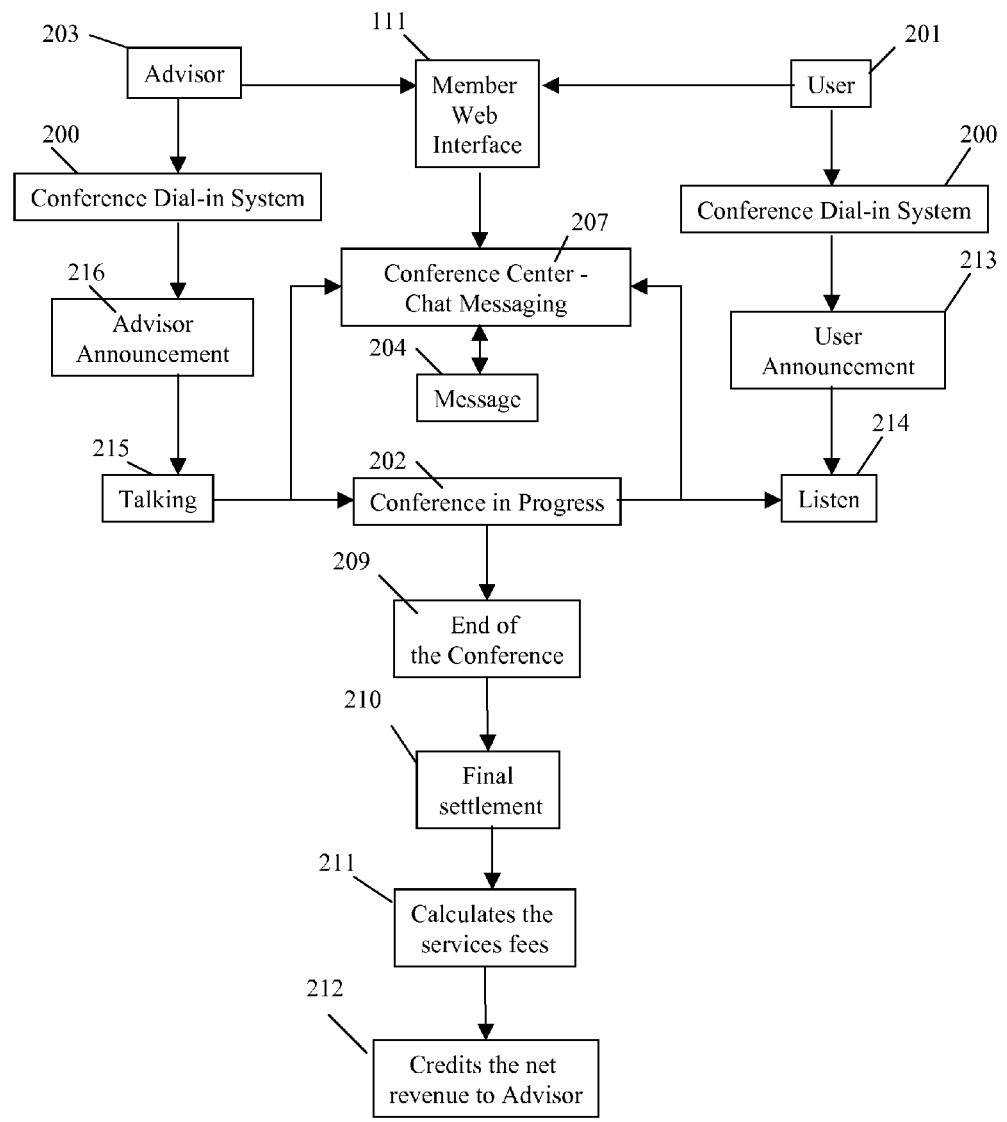
FIG. 2 illustrates the workflow process of the Conference Dial-in Flow of the present invention.

Now referring to FIG. 2, the Conference Dial-in Flow is illustrated. A User 201 dials-into the Conference dial-in system 200 and is asked to enter account identification information such as dial-in id and dial-in pin 200. Upon verifying the User 201, the system announces 213 the following message: "This is a listening only conference." During the conference, a User 201 will listen to the Advisor 203 but they would not able to talk to the Advisor 203 or any other User/participant in the conference in order to maintain privacy of everyone. If the User 201 needs to send a message 204 to the Advisor 203, the User 201 should login 205 to their account 206 online and send a message 204 to the Advisor 203 using the Conference Center 207.

Similarly, an Advisor 203 dials-into the Conference dial-in system 200 and is asked to enter account identification information such as dial-in id and dial-in pin 200. Upon verifying the Advisor 203, the system announces 216 the following message: "During the conference, you will be talking while all the Users will be in listen only mode. You should login to your account to see currently signed in users and also, to view any message received during the conference from your Users." Users 201 and Advisor 203 can send real time chat messages 204 to each other during the conference but not between one User and another User. The User 201 and Advisor 203 information are kept confidential including the User and Advisor call-in phone numbers. A User 201 can send messages to the Advisor 203 during the conference session from within their Member Web Interface, by clicking on the link "Send Message to Advisor" under the "Conference" tab. Messages will remain private and cannot be viewed by other Users participating in the conference session. Any written communication with the Advisor, before and or after the conference session, the Advisor and Users must go through the "Conference Center" tab in the system.

During the conference, the Advisor 203 is talking 215 while the Users 201 are listening 214. At the end of the conference session 209, the Advisor 203 and Users 201 hang up and the conference session proceeds for final settlement 210. The system calculates the services fees 211 and credits the net revenue to Advisor 212 account balance and the Advisor is paid.

The payments for conference sessions are consumed during the registration and are not available to use to receive one-on-one advice outside of the Conference System. If the Advisor does not log into the conference system during the session, the User's payment will be refunded upon request. A User must cancel for a pre-registered conference session no less than seventy-two (72) hours prior to the start of the conference session by sending an email to providing the proper notification in order to receive a refund.

To view history of Conference Registration charges, a User would go to the Member Web Interface you can find the history of deposits for conference sessions from within the "Deposit Transactions" tab. The User will be able to select a date to view when the charges were made into your account and for what amount. To view a history of call activity for conference sessions the user will find the call activity for conference sessions under the link for "Conference Usage Transactions" found under the "Conference" tab. The User will be able to select a date to view when they connected to the conference session and for how long.

It is appreciated that the relationships for the parts of the invention, to include variation in database and subsystem configuration to detach them for each other and provide the possibilities to deploy the system in different locations and under different authorities with division of labor, are deemed readily apparent and obvious to one of ordinary skill in the art, and all equivalent relationships to those illustrated in the drawings and described in the above description are intended to be encompassed by the present invention.

In addition, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. Method for providing a phone conference system allowing advisors to offer conference sessions to clients comprising:
   a processor;
   setting up, by the processor, an account for an advisor;
   having an advisor click on an internet-based icon to create a conference session, by the processor, by inputting date and time, charge, subject, and description information about the conference in an online system;
   providing, by the processor, a conference information link to said advisor to integrate the conference information link with online and other marketing media;
   having a client click on an internet-based icon to find available conference sessions;
   registering, by the processor, a user for a conference session;
   notifying, by the processor, the advisor of said registration;
   providing, by the processor, advisor the user account name;
   allowing, by the processor, a conference call at a scheduled conference time between one or more users and an advisor;
   ending, by the processor, the conference;
   proceeding, by the processor, to final settlement;
   calculating, by the processor, the services fees and crediting the net revenue to an advisor account balance;
   crediting, by the processor, the account for an amount based upon the number of users in a conference minus service fee; and paying the advisor.

2. The method as described in claim 1, further comprising providing, by the processor, a conference session between an advisor and one or more clients.

3. The method as described in claim 1, further comprising a phone conference system providing, by the processor, the conference session between said advisor and said clients.

4. The method as described in claim 1, further comprising providing, by the processor, a messaging center in the online system wherein users can email the advisor any questions before the conference using said messaging center, and advisors can email the user any question before the conference using said messaging center to maintain confidentiality.

5. The method as described in claim 1, further comprising checking, by the processor, with an advisory by a user to find available conference sessions.

6. The method as described in claim 1, further comprising searching, by the processor, for a conference by a conference ID or advisor name.

7. The method as described in claim 1, further comprising setting up, by the processor, an account for users.

8. The method as described in claim 1, further comprising announcing, by the processor, a message before the clients are connected to a conference session.

9. The method as described in claim 8 wherein the message announced notifies client that this is a listening only conference.

10. The method as described in claim 1, further comprising providing, by the processor, a passive conference experience for the clients.

11. The method as described in claim 10, wherein said passive experience includes listening only, wherein clients are not able to talk to the advisor or any other client in the conference.

12. The method as described in claim 10, further comprising announcing a message before the clients are connected to a passive conference session.

13. The method as described in claim 8 wherein the message announced notifies client that this during the conference, an advisor will be talking while all the clients will be in a listen only mode.

14. The method as described in claim 10, further comprising providing, by the processor, a conference chat messaging in the online system wherein clients can chat the advisor any questions during the conference using said conference chat messaging, and advisor can send chat messages and reply to a client's question during the conference using said conference chat messaging to maintain confidentiality.

15. The method as described in claim 3, further comprising joining, by the processor, a conference by a client by providing a unique dial in ID and current PIN prior to the start of the conference session after dialing in to the appropriate number.

* * * * *